(12) United States Patent
Khosrowpour et al.

(10) Patent No.: US 11,388,050 B2
(45) Date of Patent: Jul. 12, 2022

(54) ACCELERATING MACHINE LEARNING AND PROFILING OVER A NETWORK

(71) Applicant: Dell Products L. P., Round Rock, TX (US)

(72) Inventors: Farzad Khosrowpour, Pflugerville, TX (US); Sinem K. Gulbay, Austin, TX (US); Mitchell A. Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 582 days.

(21) Appl. No.: 15/723,572

(22) Filed: Oct. 3, 2017

(65) Prior Publication Data
US 2019/0104017 A1 Apr. 4, 2019

(51) Int. Cl.
*H04L 41/0813* (2022.01)
*H04L 67/303* (2022.01)
*H04L 43/0876* (2022.01)
*H04L 43/0817* (2022.01)
(Continued)

(52) U.S. Cl.
CPC ...... *H04L 41/0813* (2013.01); *H04L 41/0896* (2013.01); *H04L 43/0817* (2013.01); *H04L 43/0876* (2013.01); *H04L 67/303* (2013.01); *H04L 43/0888* (2013.01)

(58) Field of Classification Search
CPC ............. H04L 41/0813; H04L 41/0896; H04L 43/0817; H04L 43/0876; H04L 67/303; H04L 43/0888
See application file for complete search history.

(56) References Cited

U.S. PATENT DOCUMENTS

| | | | |
|---|---|---|---|
| 8,380,676 B1 * | 2/2013 | Eastham | G06F 16/125 707/662 |
| 9,438,529 B1 * | 9/2016 | Kowalski | G06F 9/45558 |
| 10,997,052 B2 | 5/2021 | Khosrowpour et al. | |

(Continued)

OTHER PUBLICATIONS

Benson, et al. (Nov. 2010). Network traffic characteristics of data centers in the wild. In Proceedings of the 10th ACM SIGCOMM conference on Internet measurement. Retrieved Dec. 30, 2020, from https://dl.acm.org/doi/pdf/10.1145/1879141.1879175.*

(Continued)

*Primary Examiner* — Lance Leonard Barry
*Assistant Examiner* — Timothy Sowa
(74) *Attorney, Agent, or Firm* — Egan, Enders & Huston LLP

(57) ABSTRACT

In some examples, a computing device executing an application may gather data associated with a usage of multiple computing resources (e.g., CPU, GPU, storage, memory, and the like) of the computing device, generate one or more packets to carry the data, and set a priority of each of the one or more packets. The computing device may send the one or more packets to a server, to other computing devices, or both. The server or the other computing devices may send a new profile. The computing device may modify a hardware and software configuration of the computing device based at least in part on the new profile to create a modified configuration and execute the application, resulting in the application having at least one of a reduced latency or an increased throughput using the modified configuration.

24 Claims, 6 Drawing Sheets

(51) Int. Cl.
*H04L 41/0896* (2022.01)
*H04L 43/0888* (2022.01)

(56) References Cited

U.S. PATENT DOCUMENTS

| | | | | |
|---|---|---|---|---|
| 2002/0069248 | A1* | 6/2002 | King | H04L 67/06 709/204 |
| 2002/0152305 | A1* | 10/2002 | Jackson | H04L 41/5035 709/224 |
| 2004/0123241 | A1* | 6/2004 | Kaappa | H04L 41/0213 715/234 |
| 2006/0184587 | A1* | 8/2006 | Federwisch | G06F 11/1451 |
| 2006/0200546 | A9* | 9/2006 | Bailey | G06F 11/3409 709/224 |
| 2013/0128729 | A1* | 5/2013 | Nair | H04L 41/069 370/229 |
| 2013/0297802 | A1* | 11/2013 | Laribi | H04L 12/6418 709/226 |
| 2014/0140213 | A1* | 5/2014 | Raleigh | H04L 67/2804 370/235 |
| 2016/0155209 | A1* | 6/2016 | Kim | G06T 1/60 345/423 |
| 2017/0116012 | A1* | 4/2017 | Cropper | H04L 47/821 |
| 2017/0126792 | A1* | 5/2017 | Halpern | H04L 41/0896 |
| 2018/0040097 | A1* | 2/2018 | Saleh | G06F 9/5094 |
| 2018/0109421 | A1* | 4/2018 | Laribi | H04L 41/0843 |
| 2018/0314774 | A1 | 11/2018 | Khosrowpour et al. | |

OTHER PUBLICATIONS

Khrosrowpour et al., "System Performance Measurement of Stochastic Workloads", U.S. Appl. No. 15/499,050, filed Apr. 27, 2017, 26 pgs.
The Free Library, "A Fuzzy-Based QoS Maximization Protocol For WiFi Multimedia (Ieee 802.11e) Ad Hoc Networks", 2014, 13 pgs.
VA Enterprise Design Patterns, "End-to-End Application Performance Monitoring (APM)" Version 1.0, Aug. 26, 2014, 22 pgs.
Selfermann, "Application Performance Monitoring in Microservice-Based Systems", Nov. 30, 2017, 85 pgs.
White Paper, "Brocade Adaptive Rate Limiting", 2015, 12 pgs.
Cfos Software, "Internet Accelerator + Ping Optimizer", Version 10.22, Captured from Internet Sep. 28, 2017, 2 pgs.
Cfos Software, "Internet Tuning/Traffice Shaping", Captured from Internet Sep. 13, 2017, 3 pgs.
Cfos Software, "Wi-Fi Access Point", Captured from Internet Sep. 19, 2017, 3 pgs.
Enterprise Management Associates, White Paper, Application Performance Monitoring (APM), Jul. 2015, 9 pgs.
Data Sheet, "Brocade Fastiron SX Series", 2015, 14 pgs.
Intel I/O Acceleration Technology, White Paper, "Accelerating High Speed Networking With Intel I/O Acceleration Technology", 2006, 8 pgs.
Qualcomm, "Qualcomm Introduces StreamBoost Technology to Optimize Performance and Capacity of Home Networks", Jan. 4, 2013, 2 pgs.
Vilches, "Qualcomm's StreamBoost to Irmprove Home Network Performance", Jan. 4, 2013, 2 pgs.
Howley, "Qualcomm StreamBoost Hands-On: Your Network on Steroids", Jan. 9, 2013, 4 pgs.
Ricknas et al., "Qualcomm Technology Boosts Streaming on Home Networks", Jan. 4, 2013, 3 pgs.
Staff, "Lenovo Rounds Out Updated Deskstop Family With Two New Workstations", Jun. 16, 2016, 6 pgs.
Cutress, "Rivert Networks Announces Killer xTend: Turning a Gaming PC Into a Switch and WiFi AP", Captured from Internet May 30, 2017, 4 pgs.
NetMotion, "Traffic Optimization Data Sheet", Oct. 2016, 2 pgs.

* cited by examiner

ACCELERATING MACHINE LEARNING AND PROFILING OVER A NETWORK

BACKGROUND OF THE INVENTION

Field of the Invention

This invention relates generally to computing devices and, more particularly, to prioritizing data being sent from a computing device to a server or additional computing devices, where the data is associated with software applications executing on a computing device. The server may use machine learning to determine a profile (e.g., configuration parameters) to improve the execution of the software applications executing on the computing device. The additional computing devices may identify a profile located on one of the additional computing devices for use by the computing device that sent the data. For example, the profile from the server or the additional computing devices may be used to modify a hardware configuration, a software configuration, or both of the computing device to reduce memory usage, reduce storage usage, reduce latency, reduce central processing unit (CPU) usage, increase response time, increase throughput, and the like associated with the execution of the software applications.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Computing workstations may include a set of preset profiles associated with computationally intensive software applications, such as applications from Adobe®, Autodesk®, and others. These software applications may use a significant amount of computing resources, including central processing unit (CPU) cycles, multiple CPU cores, graphics processing unit (GPU) cycles, memory (e.g., random access memory (RAM)), storage (e.g., disk drive), and the like. A preset profile may set hardware and software parameters associated with a computing device to enable a particular software application to execute more efficiently (e.g., reduce resource usage, reduce latency/response time, increase throughput, and the like). However, the set of preset profiles may only be associated with particular (e.g., popular) applications and may only take into account specific types of usage. Thus, the preset profiles may not provide more efficient execution of applications that are different from the particular applications or when the particular applications are used in an atypical manner (e.g., types of usage that the profiles are not designed to address).

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device that is executing an application may gather data associated with a usage, by the application, of multiple computing resources (e.g., CPU, GPU, storage, memory, and the like) of the computing device. The computing device may generate one or more packets to carry the data and set a priority of each of the one or more packets. The computing device may send the one or more packets to a server, to additional computing devices, or both. The server or additional computing devices may send one or more profiles to the computing device. The computing device may receive the profiles, select one of the profiles, and modify a hardware and software configuration of the computing device based at least in part on the profile to create a modified configuration. The computing device may execute the application and determine that executing the application results in the application having at least one of a reduced latency or an increased throughput using the modified configuration.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
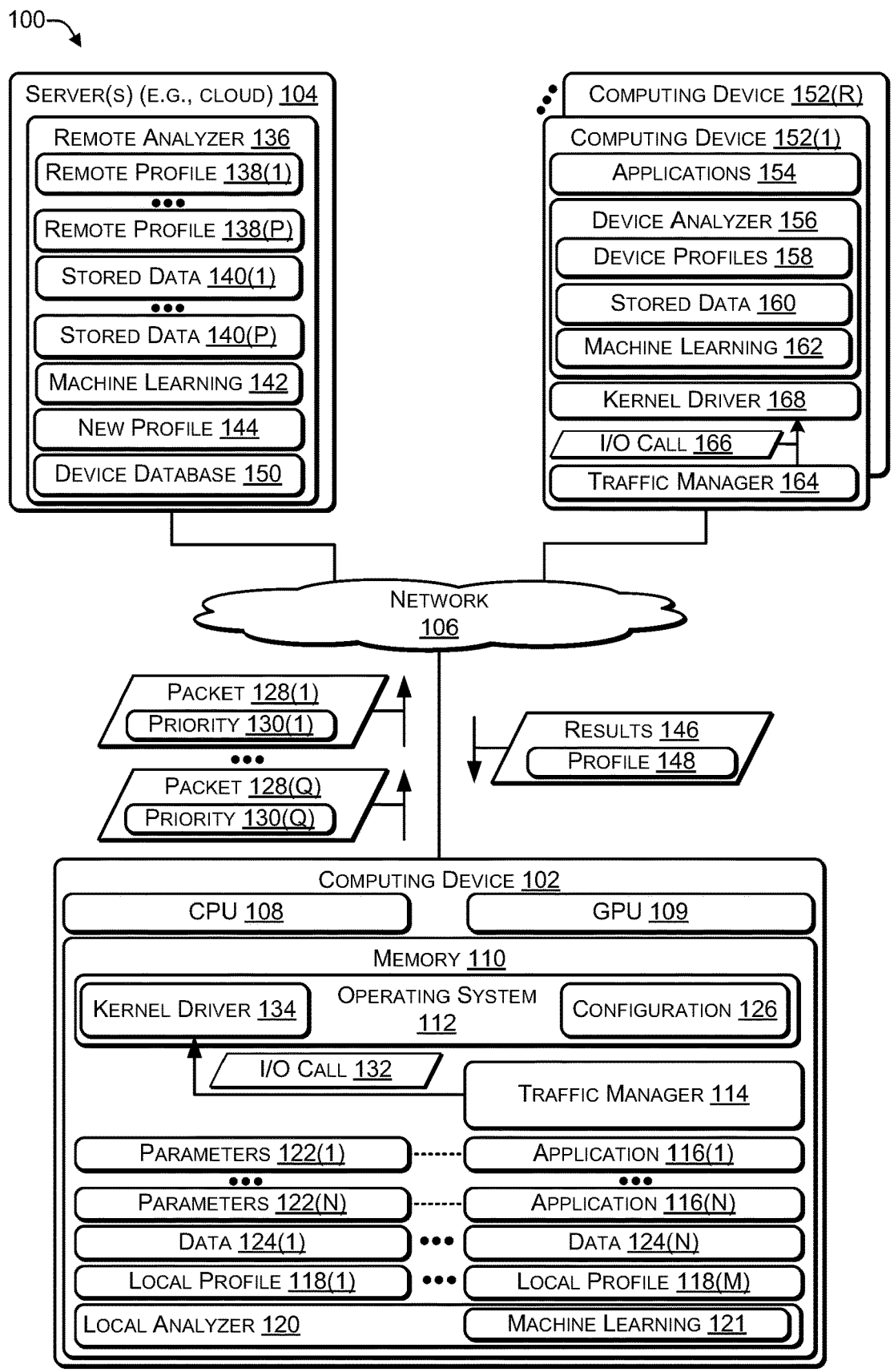
FIG. 1 is a block diagram of an architecture that includes a computing device, a remotely hosted analyzer, and additional computing devices according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may enable profiles to efficiently execute software applications on a computing device (e.g., a workstation, such as Dell® Precision® or the like) to be created by a server or identified by additional computing devices (e.g., edge devices). The computing device may include preset profiles that may be used to configure the software and/or hardware of the computing device to reduce memory usage, reduce storage usage, reduce latency (e.g., the time between an application initiating a task and completing the task), reduce central processing unit (CPU) usage, increase response time, increase throughput of the software application(s), perform another type of optimization that enables the software application(s) to execute more efficiently, or any combination thereof. Thus, the preset profiles may reduce the software application(s) usage of computing resources and/or increase throughput and reduce response times of the software applications as compared to if the preset profiles were not used to configure the software and/or hardware of the computing device.

The preset profiles may be designed for specific types of usages of particular applications. To create custom profiles for other applications (e.g., that are not addressed by the preset profiles) and for types of usage of the software application(s) for which the preset profiles were not designed, the computing device may gather data within a predetermined (or user-specified) time interval regarding how the software application(s) utilize the computing resources of the computing device. For example, the computing device may continuously or at predetermined time intervals gather data over a particular period of time regarding how the software application(s) utilize computing resources of the computing device, such as, for example, CPU utilization (e.g., clock speed/boost, queue length, number of threads used, number of cores used, and other utilization parameters), graphics utilization (e.g., graphics process unit (GPU) utilization, graphics memory utilization, GPU temperature, GPU fan speed, and other graphics utilization parameters), storage usage (e.g., including temporary files and permanent files), memory utilization, another resource usage, or any combination thereof. The computing device may send the gathered data to an analyzer module executing on a server (e.g., a cloud-based service) or on other computing devices. For example, the other computing devices may be other workstations that are similar to the computing device that is gathering the data. The computing device and the other computing devices may be located at an edge of a network and may be referred to as edge devices.

The analyzer executing on the server or other computing devices may determine if the data received from the computing device is similar to (e.g., is within a predetermined amount of) stored data associated with a previously created configuration profile. If the data is similar to the stored data, then the analyzer may send the previously created configuration profile to the computing device. If the data is not similar to the stored data, then the analyzer or the other computing devices may perform an analysis (e.g., using machine learning) of the data to create a new configuration profile and send the newly created configuration profile to the computing device. For example, the analyzer module may perform an analysis of the data using machine learning. As another example, the other computing devices may use a distributed machine learning algorithm. The machine learning algorithm may include, for example, decision tree learning, association rule learning, artificial neural networks, deep learning, inductive logic programming, support vector machine (SVM), Bayesian networks, rule-based machine learning, another type of machine learning, or any combination thereof. The computing device may use the configuration profile received from the analyzer (or from the other computing devices) to configure the software and/or hardware of the computing device when the same or similar software application(s) are executing. The configuration profile may result in the computing device executing the software application with reduced computational resource usage, reduced execution time, increased throughput, or any combination thereof.

The analyzer may be hosted by a remote server (e.g., a cloud-based service) or multiple analyzers may be hosted across multiple additional computing devices (e.g., using a distributed machine learning algorithm). Because a machine learning algorithm may perform computations that are complex and computing resource intensive, executing the analyzer (e.g., the machine learning algorithm) on the computing device itself might have an adverse impact on the performance of the computing device. To avoid slowing down the performance of the computing device, distributed computing, where at least part of the computation is performed by an analyzer hosted by one or more remote devices (e.g., remote servers, remote computing devices, or both) may be used. Distributed computing may work smoothly in situations where the computing device is not sending and/or receiving a significant amount of traffic via a network to other computing devices. However, when the computing device is sending and/or receiving a significant amount of network traffic, using a remotely hosted analyzer to analyze data and identify an existing profile or create a custom profile may result in sluggish and delayed performance due to priority conflicts with other network workloads.

The systems and techniques described herein may use a network traffic prioritization component executing on the computing device to identify messages (e.g., packets) that include data to be sent for analysis (e.g., to a server, to other edge computing devices, or both) and prioritize the messages over other types of network traffic. Thus, using a remotely hosted analyzer may offload the computational burden of analyzing data associated with the execution of software applications on a computing device to identify a matching remote profile to create a custom configuration profile. Using a network traffic prioritization component to prioritize data that is being sent for analysis may enable the remote analyzer(s) to provide a custom configuration profile (e.g., either a previously created profile or a newly created profile) to the computing device in a timely manner. For example, by using the network traffic prioritization component, the time interval between sending the data and receiving a profile may satisfy a predetermined threshold (e.g., several seconds or less). In this way, an existing profile being used on another computing device or a custom configuration profile may be provided for applications and for types of usage other than for which the preset profiles were designed.

For example, a computing device may execute an application and gather data associated with a usage, by the application, of computing resources (e.g., CPU, GPU, memory, storage, and the like) of the computing device. For example, the data may indicate at least one of: a CPU utilization by the application, a GPU utilization by the application (e.g., GPU memory utilization, a temperature of the GPU, a fan speed of the GPU, or the like), a disk drive utilization by the application (e.g., a location and a size of at least one file created by the application), a random-access memory (RAM) utilization by the application, and other resource utilization data. The CPU utilization may include a clock speed (including how often the clock speed is boosted to a higher speed) of the CPU when the application is being executed, a queue length of the CPU when the application is being executed, a number of threads being executed by the CPU when the application is being executed, a number of cores of the CPU used by the application when the application is being executed, and other CPU utilization data. The computing device may compare the data with previously gathered data associated with a previous execution of the application. If a difference between the data and the previously gathered data satisfies a predetermined threshold, then the computing device may generate multiple packets, with each packet including a portion of the data, set a priority of each of the packets (e.g., to a priority that is higher than some of the packets being sent from the computing device), and send the multiple packets to an analyzer on a server, on other computing devices, or both. The priority of each of the one or more packets may be set using an input/output (I/O) control call to a kernel driver that is used to manage outgoing packets.

The computing device may repeatedly gather data over pre-determined time intervals to continuously and dynamically improve the efficiency of executing one or more applications on the computing device. For example, a user may engage in a first particular type of usage of one or more applications. The computing device may gather data associated with the first particular type of usage, send the data to one or more remote devices, receive a first profile (e.g., either a newly created profile or a previously created profile) from the remote devices, and apply the first profile to modify a software and/or hardware configuration of the computing device. The modifications may reduce latency, increase throughput, reduce computational resource usage, or the like. The user may, after a period of time has elapsed, engage in a second particular type of usage of one or more applications. The computing device may gather data associated with the second particular type of usage and determine that the computing resource usage of the second particular type of usage is different than the computing resource usage of the first particular type of usage. The computing device may send the data associated with the second particular type of usage to one or more remote devices, receive a second profile (e.g., either a newly created profile or a previously created profile) from the remote devices, and apply the second profile to modify a software and/or hardware configuration of the computing device. The modifications may reduce latency, increase throughput, reduce computational resource usage, or the like. The computing device may thus repeatedly gather data associated with computational resource usage and, when the data differs from previously gathered data by more than a threshold amount, the computing device may send the data and receive a profile that modifies the hardware and/or software configuration of the applications.

The computing device may receive, from the server (or the other computing devices), a new profile (e.g., new to the computing device) and modify an original configuration of the computing device (including parameters associated with the application), based at least in part on the new profile, to create a second configuration. The second configuration may specify: a maximum number of central processing unit (CPU) cores that the application can use, a process priority control policy indicating a higher process priority for processes associated with the application, a system power utilization policy indicating utilization of electrical power, a CPU hyperthreading policy indicating the way in which the application can use hyperthreading, a vertical sync (VSync) parameter associated with a graphics processing unit (GPU) of the computing device, a location and a size of files created by the application (e.g., including temporary files and permanent files), another configurable parameter associated with the computing device (including parameters associated with the application), or any combination thereof. The computing device may execute the application and determine that the application may have a reduced latency or an increased throughput using the second configuration as compared to using the original configuration.

The computing device may execute a second application, gather second data identifying a second usage, by the second application, of the multiple computing resources. The computing device may select, based on the second data associated with the second application, a local profile and modify the second configuration based at least in part on the local profile to create a third configuration. The computing device may determine that executing the second application using the third configuration causes the second application to have at least one of a reduced latency or an increased throughput. In this way, the computing device may dynamically monitor computing resource usage of applications and modify the hardware and/or software configuration of the computing device when the computing resource usage changes significantly (e.g., by more than a predetermined amount).

FIG. 1 is a block diagram of an architecture 100 that includes a computing device, a remotely hosted analyzer, and additional computing devices according to some embodiments. A computing device 102 may be communicatively coupled, via a network 106, to one or more server(s) 104 and to one or more additional computing devices 152(1) to 152(R). The computing devices 102, 152 may be located at or near an outer edge of the network 106 and may be referred to as edge devices.

The computing device 102 (and each of the computing devices 152) may include at least one central processing unit (CPU) 108, at least one graphics processing unit (GPU) 109, and a memory 110. The memory 110 may include various types of storage devices, such as, for example, read-only memory (ROM), random access memory (RAM), one or more disk drives, and the like. The memory 110 may be used to store software instructions that are executable by processors 108, 109 to perform various functions. For example, the memory 110 may include an operating system 112 (e.g., Windows®, Android®, Linux®, Unix®, or the like), a traffic manager 114, one or more software applications 116(1) to 116(N) (where N>0), one or more local profiles 118(1) to 118(M) (where M>0), and, in some cases, a local analyzer 120. For example, the software applications 116 may include applications that are computationally intensive, e.g., the applications 116 may use a significant amount of resources (e.g., including the CPU 108, GPU 109, and the memory 110) when executing. The profiles 118 may include preset profiles created by a supplier of the computing device 102 and shipped (e.g., from the factory) with the computing device 102. The preset profiles may be designed for a particular set of applications and for particular usages of the particular set of applications. The profiles 118 may include profiles received from the server 104. The profiles 118 may include profiles received from one or more of the computing devices 152. The profiles 118 may include profiles created by a local analyzer 120.

Each of the applications 116(1) to 116(N) may have a corresponding set of parameters 122(1) to 122(N) that may be used to configure each application. For example, the application 116(1) may have a corresponding set of parameters 122(1) and the application 116(N) may have a corresponding set of parameters 122(N). To illustrate, the parameters 122(N) may specify a maximum amount of temporary space that the corresponding application 116(N) may use, a location of the temporary space, the size of various internal buffers and/or queues, a maximum number of threads (e.g., how many instances of the application 116(N) may be created at the same time), another execution-related parameter, or any combination thereof. The parameters 122 may include parameters that can be adjusted by a user when the application is executing by selecting "options", "preferences", or another configuration interface.

The local analyzer 120 may gather data when one or more of the applications 116 are being executed by the computing device 102. The data may be gathered in response to specific events occurring, such as when one or more of the applications 116 is launched (e.g., initiates execution). The data may be gathered over a predetermined (or user-specified) period of time, such as P minutes (where P>0). For example, the local analyzer 120 may gather data 124(1) associated with execution of the application 116(1) and gather data 124(N) associated with execution of the application 116(N). To illustrate, the data 124(N) may include information associated with how the corresponding application 116(N) is using resources of the computing device 102, such as, for example, utilization of the CPU 108 (e.g., clock speed, how often clock speed boost is used, queue length, number of threads used, number of cores used, and other utilization parameters), utilization of the GPU 109 (e.g., graphics memory utilization, GPU temperature, GPU fan speed, and other graphics utilization parameters), utilization of the memory 110 (e.g., including a size of temporary files and permanent files), network bandwidth utilization (e.g., the amount of data the application 116(N) has sent and the amount of data that the application 116(N) has received), another resource usage, or any combination thereof. The data 124 may include information identifying the application (e.g., one of the applications 116) for which the data was gathered. For example, the data 124(N) may indicate that the data 124(N) was gathered while the application 116(N) was executing.

Based on the application(s) 116 being executed at a particular point in time (e.g., currently) and, in some cases, the corresponding data 124, the local analyzer 120 may determine if one of the local profile(s) 118 may be used. For example, the local analyzer 120 may determine that the application 116(N) is currently being executed. The local analyzer 120 may determine whether one of the local profiles 118 is associated with the application 116(N). To illustrate, if the local profile 118(M) is associated with the application 116(N), then the local analyzer 120 may select the local profile 118(M) to configure the application 116(N) and the computing device 102. As another example, the local analyzer 120 may determine that the application 116(N) is currently being executed and gather corresponding data 124(N) over a predetermined (or user-specified) amount of time. The local analyzer 120 may determine, based on the application being executed (e.g., the application 116(N)) and the corresponding usage data (e.g., the data 124(N)), whether one of the local profiles 118(M) matches the application and the usage data. To illustrate, the local profiles 118 may include multiple different types of usage (e.g., creating, editing, and converting from a first format to a second format) of the application 116(N). The local analyzer 120 may determine, based on usage data 124(N), that the application 116(N) is being used to perform a particular one of the multiple types of usage and select the local profile (e.g., 118(M)) that matches the current usage of the application 116(N). In some cases, the local analyzer 120 may use more than a single time interval to gather data. For example, the local analyzer 120 may gather data over a relatively short time interval (e.g., X seconds, where X>0) to determine a snapshot of the computational resource usage of an application that is being executed. The snapshot may be used by the local analyzer 120 to determine whether one of the local profiles 118 can be applied. If the local analyzer 120 determines that none of the local profiles 118 are applicable, then the local analyzer 120 may gather data over a longer period of time (e.g., Y minutes, where Y>0) to send to an external host for further analysis (e.g., using machine learning).

After the local analyzer 120 selects a particular profile (e.g., local profile 118(M)) of the local profiles 118, the local analyzer 120 may modify a configuration 126 of the operating system 112, modify one or more parameters associated with the application being executed, or both. The configuration 126 may include the number of CPU cores that an application can use, process priority control policy (e.g., a policy specifying which processes are to be executed with a high priority, which processes are to be executed with a lower priority, and the like), system power utilization policy (e.g., a policy specifying how power is to be utilized), CPU hyperthreading policy, vertical sync (VSync, e.g., to match a frame rate to a display device's refresh rate), and other configuration parameters. For example, if the application 116(N) is currently being executed, the local analyzer 120 may gather resource usage data 124(N). Based on the application 116(N) and the resource usage data 124(N), the local analyzer 120 may select local profile 118(M). The local analyzer 120 may, based on the local profile 118(M): (i) modify the configuration 126, (ii) modify the parameters 122(N) associated with the application 116(N), or (iii) both (i) and (ii). The configuration 126 may include both a hardware configuration of the computing device 102 and a software configuration (e.g., operating system and run time environment) of the computing device 102. For example, the configuration 126 may be modified to give one or more processes (e.g., instances) of the application 116(N) a higher execution priority than other processes (e.g., of other applications) being executed by the computing device 102. In this way, the CPU 108 may execute processes of the application 116(N) more often than other processes. As another example, the configuration 126 may be modified to provide the application 116(N) with additional temporary storage space or relocate the temporary storage space from a first drive to a second drive. Relocating the temporary storage space may reduce disk input/output (I/O) congestion associated with a single drive. In some cases, the temporary storage space may be relocated to a faster drive (e.g., a virtual drive in RAM or on a solid-state drive (SSD)). The local profiles 118 may be used by the computing device 102 to modify the configuration 126 and/or one or more of the parameters 122 to more efficiently use (e.g., reduce usage of) CPU resources (e.g., clock speed/boost, queue length, number of threads used, number of cores used, and other CPU resources), more efficiently use graphics resources (e.g., including graphics process unit (GPU) utilization, graphics memory utilization, reduce GPU temperature, reduce GPU fan speed, and the like), more efficiently use storage resources (e.g., reduce a size and/or change locations of temporary files and permanent files), more efficiently use memory resources, reduce latency (e.g., the time interval between when an application initiates a task and when the application completes the task), increase throughput (e.g., an application is able to perform a task of greater complexity or perform more tasks in a particular period of time), or any combination thereof.

If the local analyzer 120 determines, based on the application being executed and the corresponding usage data, that none of the local profiles 118(M) matches the application and/or the usage data, then the local analyzer 120 may create a new profile using a machine learning algorithm 121 or send the corresponding usage data to the server 104. For example, if the computing device 102 has sufficient computing resources to execute the machine learning algorithm 121 without significantly affecting the execution of the applications 116, then the local analyzer 120 may use the machine learning 121 to create a new profile. If the computing device 102 has insufficient computing resources to execute the machine learning algorithm 121, then the local analyzer 120 may gather the usage data 124(N) associated with the application 116(N), determine that the local profiles 118(M) do not match the application 116(N) and/or the usage data 124(N), and send the usage data 124(N) to the traffic manager 114 to send to the server 104 one or more of the computing devices 152, or any combination thereof. The local profiles 118(M) may not match the application 116(N) when the local profiles 118 are designed for applications other than the application 116(N). For example, the local profiles 118 may be designed to address twenty different software applications but the application currently being executed may not be one of the twenty software applications. If an application is being used in a manner that is not addressed by any of the local profiles 118, then the local profiles 118(M) may not match the usage data 124(N). For example, the local profiles 118 may be designed to address multiple different use cases associated with a particular software application but a user may be using the application in a way that is not addressed by the multiple use cases.

The traffic manager 114 may receive the resource usage data (e.g., one or more of the data 124) associated with one or more of the applications 116 from the local analyzer 120 and create one or more packets 128(1) to 128(Q) (where Q>0) that include the resource usage data 124. The traffic manager 114 may modify a priority 130 of each of the packets 128 that are transporting the resource usage data from a default priority to a high priority. For example, the priority 130(1) of the packet 128(1) and the priority 130(Q) of the packet 128(Q) may be a higher priority as compared to at least some of the other packets that are being sent from the computing device 102. The traffic manager 114 may manage network traffic priorities while maintaining a predetermined quality of service (QoS) level for the packets 128. In some cases, the traffic manager 114 may manage network traffic priorities and QoS for the packets 128 using an input/output (I/O) control (IOCTL) call 132 to a kernel driver 134 in the operating system 112. The I/O call 132 may be a system call for a device-specific input/output operation (e.g., network operation) that may not be handled by regular system calls. For example, the I/O call 132 may enable the traffic manager 114 to specify the priority 130 of the packets 128 that are carrying one or more of the resource usage data 124. In some cases, the kernel driver 134 may communicate with a special network socket (or other software component or hardware component) that is used to send higher priority packets.

Each of the computing devices 152 may include one or more applications 154, and a device analyzer 156. The device analyzer 156 may have access to multiple device profiles 158 (e.g., similar to the local profiles 118 that the local analyzer 120 may access). Stored data 160 may be associated with each of the device profiles 158. For example, a first of the stored data 160 may be associated with a first of the device profiles 158, and so on (e.g., similar to the data 140 corresponding to the profiles 138). Each of the computing devices 152 may execute a portion of a distributed machine learning algorithm 162. Each of the computing devices 152 may include a traffic manager 164 to prioritize packets that include one or more of the device profiles 158 that are sent to the computing device 102. For example, in each of the computing devices 152, the traffic manager may use an I/O call 166 (e.g., IOCTL) to a kernel driver 168 to prioritize packets that include one or more of the device profiles 158 that are sent to the computing device 102.

A remote analyzer 136 executing on one or more of the servers 104 (and/or the device analyzer 156 executing on the computing devices 152) may receive the packets 128 sent from the computing device 102. For example, the remote analyzer 136 may be a cloud-based service. The remote analyzer 136 (or the device analyzer 156) may extract the resource usage data (e.g., one or more of the data 124) and an identity of the application(s) 116 that were executing when the resource usage data was gathered. The remote analyzer 136 (or the device analyzer 156) may determine whether one of multiple remote profiles 138(1) to 138(P) (or the device profiles 158) is associated with the application and whether the resource usage data from the packets 128 matches stored data 140(1) to 140(P) (or the stored data 160). The remote profiles 138 (and the device profiles 158) may include previously created profiles. In some cases, the remote analyzer 136 may provide profiles to multiple client devices (e.g., the computing devices 152). For example, the packets 128 may be associated with resource usage data associated with a particular application that is executing on the computing device 102 for the first time. However, the remote analyzer 136 may have previously created a profile (e.g., one of the remote profiles 138) for the particular application when the particular application was executed on another computing device (e.g., the computing device 152 (R)). In such cases, the remote analyzer 136 may determine, based on comparing the resource usage data 124 to the stored data 140, that one of the applications 116 is being used in a particular manner and select one of the remote profiles 138 that matches (e.g., is within a predetermined threshold of) the usage of the application. The selected one of the remote profiles 138 may be sent to the computing device 102. For example, the server 104 may send results 146 that include a profile 148, where the profile 148 comprises the selected one of the remote profiles 138.

If the remote analyzer 136 determines that the remote profiles 138 and the stored data 140 do not match the application and resource usage data extracted from the packets 128, then the remote analyzer 136 may use a machine learning algorithm 142 to create a new profile 144. For example, the remote analyzer 136 may perform an analysis of the resource usage data received in the packets 128 using the machine learning algorithm 142, such as, for example, one or more of decision tree learning, association rule learning, artificial neural networks, deep learning, inductive logic programming, support vector machine (SVM), Bayesian networks, rule-based machine learning or the like. The machine learning algorithm 142 may identify one or more modifications to the configuration 126 and/or modifications to one or more of the parameters 122 that improve the execution of the application(s) associated with the data in the packets 128. In some cases, the computing devices 152 may receive the packets 128 and use a distributed machine learning algorithm 162 to create the profile 148. The server 104 may send the results 146, including the profile 148, to the computing device 102. The traffic manager 164 The remote analyzer 136 may store the new profile 144 along with the remote profiles 138. If, at a later point in time, the remote analyzer 136 receives information identifying the same application being used in a similar manner, the remote analyzer 136 may select the new profile 144 (e.g., without having to use the machine learning algorithm 142). The device analyzer 156 may store a newly created profile with the device profiles 158.

In some cases, the server 104 may determine that the resource usage data in the packets 128 matches resource usage data stored in a device database 150. For example, based on the device database 150, the server 104 may determine that the computing device 102 is executing a particular set of applications in a manner similar to the computing device 152(R). The server 104 may instruct the computing device 152(R) to send the appropriate device profile 158 (e.g., in results 146) to the computing device 102 or the server 104 may retrieve the the appropriate device profile 158 from one of the computing devices 152 and send the device profile 158 in the results 146. When sending one or more of the device profiles 158 to the computing device 102 in the results 146, the traffic manager 164 may increase a priority of the results 146 (e.g., giving the results 146 a higher priority than at least some of the other traffic being sent from the computing devices 152) before sending the results 146 to the computing device 102.

The computing device 102 may receive the results 146 that include the profile 148, where the profile 148 is either one of the previously determined remote profiles 138 or a new profile 144 (e.g., determined using the machine learning algorithm 142 or the distributed machine learning algorithm 162). The computing device 102 may apply the profile 148 to the computing device 102 by modifying the configuration 126 (e.g., hardware parameters associated with the computing device 102 and software parameters associated with the operating system 112), one or more of the parameters 122, or both. The computing device 102 may use the profile 148 to modify (i) the configuration 126 and/or (ii) one or more of the parameters 122 to more efficiently use computing resources to reduce latency, increase throughput, and the like. For example, applying the profile 148 may result in one or more of the applications 116 making more efficient use of: (i) processor resources (e.g., the CPU 108), (ii) graphics resources (e.g., the GPU 109), (iii) storage resources (e.g., the memory 110), thereby reducing latency and increasing throughput.

In some cases, multiple profiles may be active at the same time. For example, if a first and a second application are being executed substantially at the same time, the local analyzer 120 may select and apply a first profile for the first application and a second profile for the second application. The first profile may be one of the local profiles 118, one of the remote profiles 138, or the new profile 144. The second profile may be one of the local profiles 118, one of the remote profiles 138, or the new profile 144. Thus, if R number of applications are executing (R>0), then there may be up to R number of profiles that are active (e.g., in use). The operating system 112 may use a conflict resolution policy to resolve differences between the multiple active profiles.

Determining whether the computational resource usage data associated with an application matches a profile (e.g., one of the local profiles 118, the remote profiles 138, or the device profiles 158) may include comparing various resource usages, such as how much of the CPU 108 resources were used (e.g., number of cores used, number of hyper-threads used, queue length, cache usage, clock speed in terms of how often clock speed boost was used, and the like), storage usage (e.g., size and location of temporary files, permanent files, and the like), and other resource usage. For example, a particular profile may be designed to reduce the usage of specific types of resources. To illustrate, a particular profile may be used if CPU clock speed is boosted for more than a predetermined amount of time. The profile may increase a process priority of the application (and any processed spawned by the application) to reduce the number of times the CPU clock speed is boosted. As another example, if the gathered computational resource usage data indicates that an application's execution is slow because of frequent accesses to a file on a hard disk drive, a disk-related profile may be selected. For example, the disk-related profile may allocate, to the application, a virtual drive in faster storage (e.g., RAM), file space on a solid state drive (SSD), or file space on a second drive that is separate from the main drive used by the operating system (e.g., thus avoiding the operating system 112 and the application both simultaneously requesting access to the main drive, thereby improving disk access speeds).

Thus, the local analyzer 120 may determine that an application, such as the application 116(N), is executing, and gather the data 124(N) associated with the resource usage of the application 116(N). If the local analyzer 120 determines that the local profiles 118 do not match the application 116(N) and the associated data 124(N), then the local analyzer 120 may send the data 124(N) (including information identifying the application 116(N)) to the traffic manager 114 for forwarding to the server 104 (and/or the computing devices 152). The traffic manager 114 may place the data 124(N) in the packets 128 and modify the packets 128 to have a high priority 130 (e.g., a higher priority than at least some of the network traffic being sent from the computing device 102). The remote analyzer 136 (or the device analyzer 156) may extract the data 124(N) from the packets 128 and either (i) identify one of the remote profiles 138 (or the device profiles 158) as matching the data 124(N) (or data 160) or (ii) create the new profile 144. The remote analyzer 136 (or the device analyzer 156) may send the profile 148 (e.g., either one of the remote profiles 138, the new profile 144, or the device profiles 158) in the results 146. The device analyzer 156 may instruct the traffic manager 164 to prioritize the results 146 over other traffic being sent from the devices 152. The computing device 102 may receive and apply the profile 148 by modifying the configuration 126, modifying the parameters 122(N), or modifying both. After applying the profile 148 (e.g., by modifying the configuration 126 and/or the parameters 122(N)), the application 116(N) may execute more efficiently (e.g., with reduced latency, increased throughput, and the like) as compared to the execution of the application 116(N) before the profile 148 was applied. By using the traffic managers 114 to prioritize packets that include one or more of the data 124(1) to 124(N), the time interval between when the local analyzer 120 sends the data 124(N) to the traffic manager 114 and when the results 146 are received may be reduced to several seconds or less. If the traffic manager 114 were not used, the packets 128 might incur a delay in being sent, resulting in a length wait time between when the local analyzer 120 sends the data 124(N) to the traffic manager 114 and when the results 146 are received. By using the traffic manager 164 to prioritize packets the results 146 that include the profile 148 (e.g., one of the device profiles 158 or a newly created profile), the time interval between when one of the edge devices 152 sends the results 146 and when the computing device 102 receives the results 146 may be reduced. If the traffic manager 164 were not used, the results 146 might incur a delay in being sent. In this way, custom configuration profiles can be provided to the computing device 102 (e.g., a workstation) when the computing device 102 is executing applications that are not addressed by the local profiles 118 or when applications are being used in ways that are not addressed by the local profiles 118.

In the flow diagrams of FIGS. 2, 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, 400, and 500 are described with reference to FIG. 1, as described above, although other models, frameworks, systems and environments may implement these processes.

Figure 2:
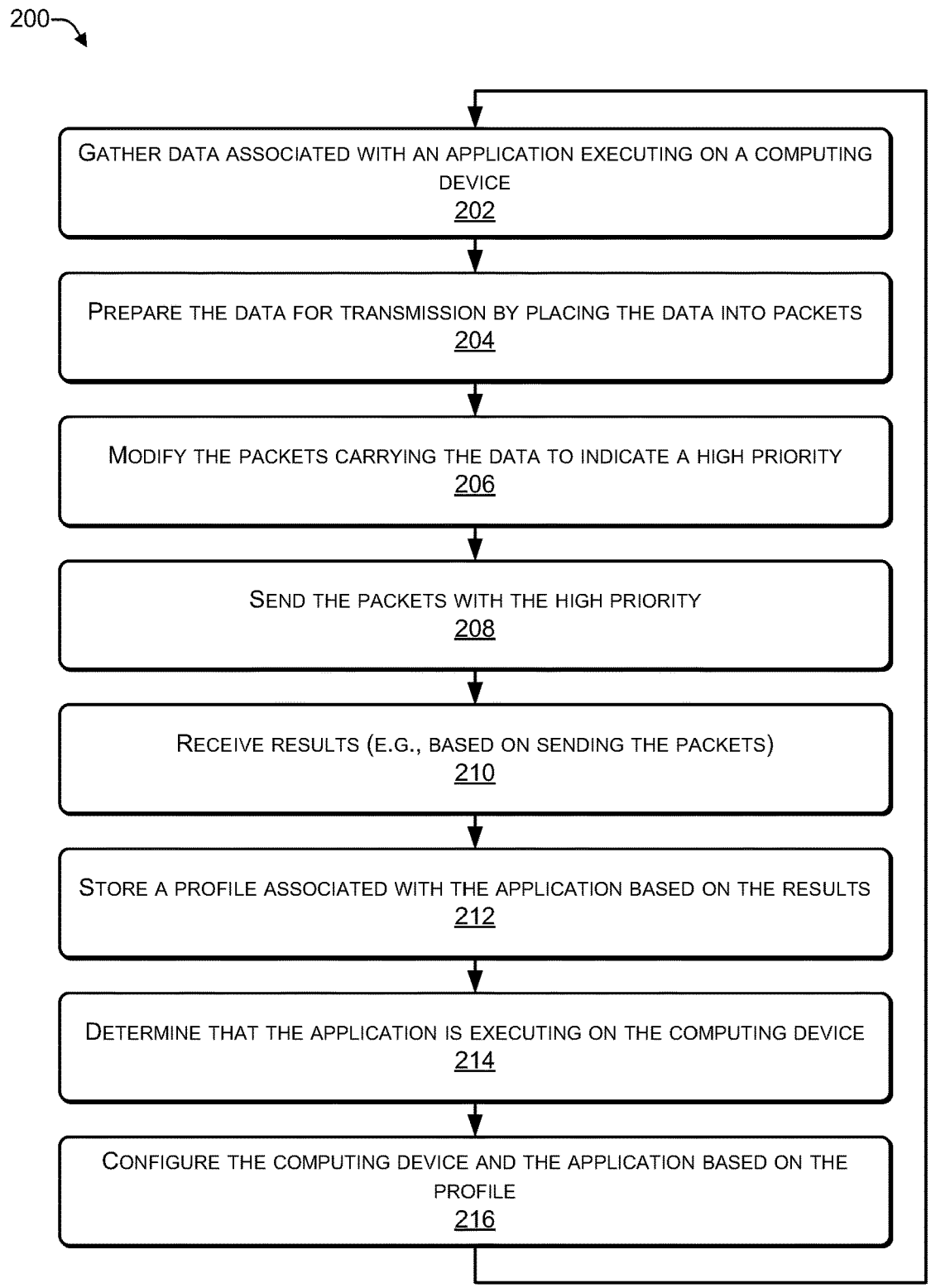
FIG. 2 is a flowchart of a process that includes setting packets carrying data to indicate a high traffic priority according to some embodiments.

FIG. 2 is a flowchart of a process 200 that includes setting a priority of packets carrying data to indicate a high traffic priority according to some embodiments. The process 200 may be performed by the computing device 102 of FIG. 1.

At 202, data associated with an application executing on a computing device may be gathered. At 204, the data may be prepared for transmission by creating packets that include the data. At 206, the packets carrying the data may be modified to indicate that the packets have a high traffic priority. At 208, the packets with the high traffic priority may be sent (e.g., before sending other, lower priority packets). For example, in FIG. 1, the local analyzer 120 may gather data (e.g., the data 124(N)) associated with one or more of the applications 116 (e.g., the application 116(N)) that are executing on the computing device 102. The data may be gathered over a pre-determined (or user-specified) period of time, such as R minutes (where R>0). The local analyzer 120 may send the data (e.g., the data 124(N)) corresponding to the application(s) 116 that are executing on the computing device 102 to the traffic manager 114. The traffic manager 114 may prepare the data for transmission by creating the packets 128 that include the data and set a priority associated with the packets 128 carrying the data to a high priority (e.g., a higher priority than at least some portion (e.g., more than 50%) of the traffic being sent from the computing device 102). The traffic manager 114 may send the packets 128 from the computing device 102 to the server 104 (and/or the computing devices 152). The remote analyzer 136 (or the device analyzer 156) may extract the data from the packets 128 and determine whether the data matches one of the existing remote profiles 138 (or the device profiles 158). If the data matches one of the existing remote profiles 138 (or the device profiles 158), the remote analyzer 136 may select one of the remote profiles 138 (or the device profiles 158) that matches the data and send the selected profile in the results 146 to the computing device 102. If the data does not match one of the existing remote profiles 138, the remote analyzer 136 may create (e.g., using the machine learning algorithm 142) the new profile 144 and send the new profile 144 (e.g., in the results 146) to the computing device 102. If the data does not match one of the device profiles 158, the device analyzer 156 may create (e.g., using the distributed machine learning algorithm 162) a new profile and send the new profile (e.g., the profile 148) in the results 146 to the computing device 102. The device analyzer 156 may instruct the traffic manager 164 to prioritize the results 146 over other network traffic being sent from the computing devices 152.

At 210, results may be received (e.g., from the remote server or from other edge devices). At 212, a profile for the application may be stored, based on the results. For example, in FIG. 1, the computing device 102 may receive the results 146 and store the profile 148 in the memory 110 (e.g., along with the local profiles 118). The profile 148 may be stored with an indication as to the application(s) for which the profile 148 is designed and, in some cases, the types of usages of the application for which the profile 148 is designed. For example, each particular usage of an application may have a different usage profile. To illustrate, if an application has three different usages (e.g., content creation, content editing, and format conversion), each usage may have a separate usage profile, e.g., <application name><usage type>. For example, a usage profile for using the application Photoshop® to convert a picture from RAW format to another format (e.g., JPEG) may be called "Photoshop RAW conversion".

At 214, a determination may be made that the application is executing on the computing device. At 216, the computing device and the application may be configured based on the profile, and the process 200 may repeat by proceeding to 202 where a new set of data is gathered. For example, in FIG. 1, each time one of the applications 116 is launched (e.g., initiates execution), the local analyzer 120 may determine which application(s) are executing and determine whether one of the local profiles 118 matches the usage of the application(s). In this example, after the profile 148 has been stored in the memory 110, each time the local analyzer 120 detects that the application 116(N) is being executed, the local analyzer 120 may gather the data 124(N), and determine that the profile 148 matches the usage of the application 116(N). The local analyzer 120 may instruct the operating system 112 to modify the configuration 126 (e.g., a software and hardware configuration of the computing device 102) and/or modify the parameters 122(N) associated with the application 116(N). The operating system 112 may modify the configuration 126 and/or the parameters 122(N) to improve the execution of the application 116(N). For example, the modifications may result in more efficient utilization of computing resources, resulting in lower latency and increased throughput when the application 116(N) is executing.

Thus, the local analyzer 120 may determine that an application, such as the application 116(N), is executing, and gather the data 124(N) associated with the resource usage of the application 116(N). The local analyzer 120 may send the data 124(N) to the traffic manager 114 for forwarding to the server 104 (or the devices 152). The traffic manager 114 may create the packets 128 that include the data 124(N) and modify the packets 128 to have a higher priority that at least some of the packets being sent from the computing device 102. The remote analyzer 136 may extract the data 124(N) from the packets 128 and either (i) identify one of the remote profiles 138 as matching the data 124(N) or (ii) create the new profile 144. The remote analyzer 136 may send the profile 148 (e.g., either the remote profiles 138 or the new profile 144) in the results 146. The computing device 102 may receive and apply the profile 148 by modifying the configuration 126, modifying the parameters 122(N), or modifying both. After modifying the configuration 126 and/or the parameters 122(N), the application 116(N) may execute more efficiently as compared to the execution of the application 116(N) before the profile 148 was applied. By using the traffic manager 114 to prioritize packets that include one or more of the data 124(1) to 124(N), the time interval between when the local analyzer 120 sends the data 124(N) to the traffic manager 114 and when the results 146 are received may be reduced to several seconds or less. In this way, custom configuration profiles can be provided to the computing device 102 (e.g., a workstation) when the computing device 102 is executing applications that are not addressed by the local profiles 118 or when applications are being used in ways that are not addressed by the local profiles 118.

Figure 3:
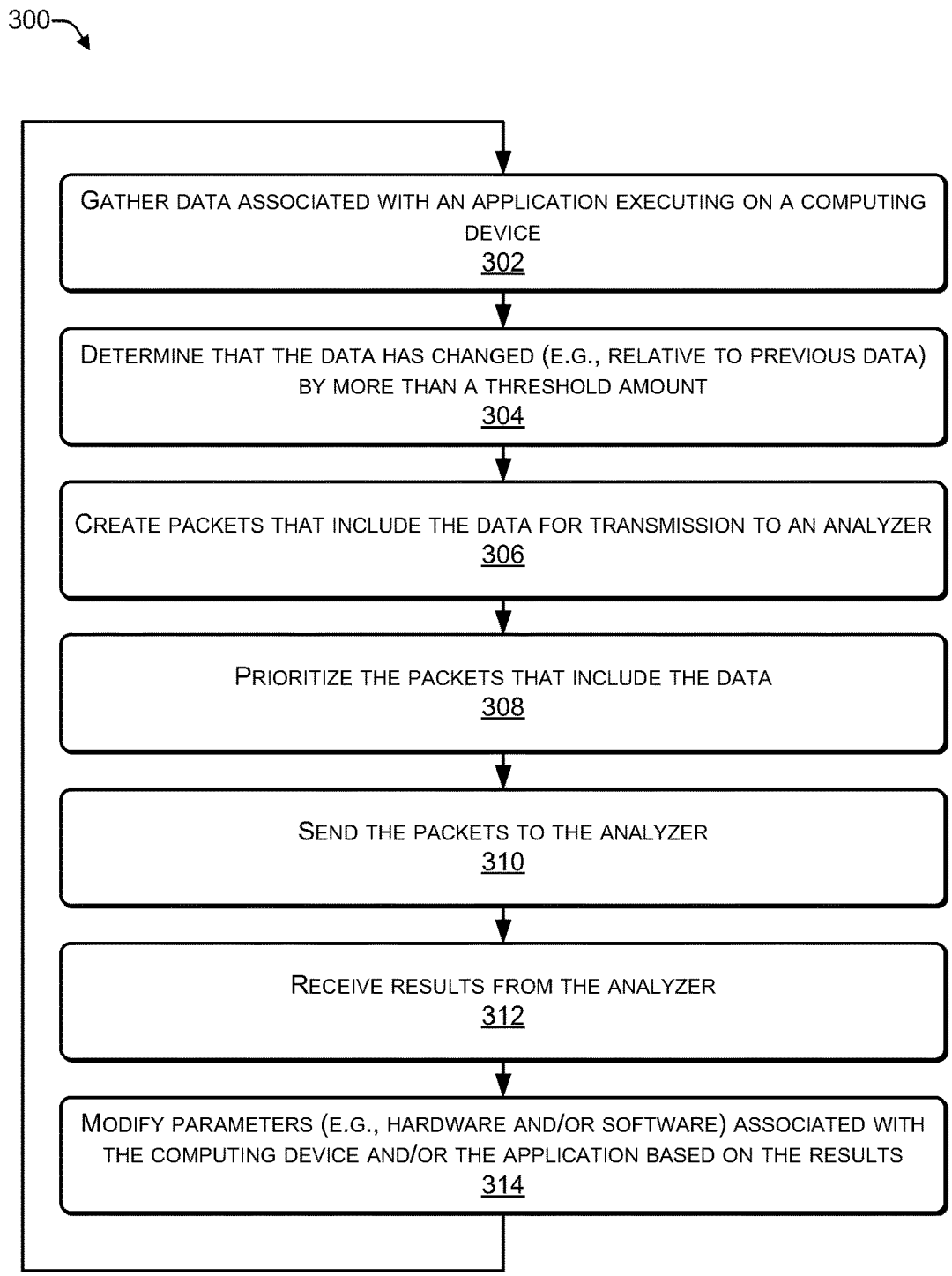
FIG. 3 is a flowchart of a process that includes modifying one or more parameters associated with a computing device according to some embodiments.

FIG. 3 is a flowchart of a process 300 that includes modifying one or more configuration parameters associated with a computing device according to some embodiments. The process 300 may be performed by the computing device 102 of FIG. 1.

At 302, data associated with an application executing on a computing device may be gathered. At 304, a determination may be made that the data has changed by more than a threshold amount (e.g., compared to previous data). At 306, the data may be placed into packets for transmission (e.g., to an analyzer hosted by a remote server or other edge computing devices). At 308, the packets that include the data may be prioritized. At 310, the packets with the high traffic priority may be sent (e.g., before sending other, lower priority packets). For example, in FIG. 1, the local analyzer 120 may gather resource usage data (e.g., the data 124(N)) associated with one or more of the applications 116 (e.g., the application 116(N)) that are executing on the computing device 102. The resource usage data may be gathered over a pre-determined (or user-specified) period of time, such as R minutes (where R>0). The local analyzer 120 may determine that a difference between (i) the gathered resource usage data and (ii) previously gathered resource usage data satisfies a threshold (e.g., is greater than a threshold amount). For example, the current resource usage by an application may differ by more than a threshold amount compared to previous resource usage by the same application, indicating that applying a different resource usage profile may improve the performance of the applications 116 that are being executed. The local analyzer 120 may send the gathered resource usage data (e.g., the data 124(N) corresponding to the application 116(N) executing on the computing device 102) to the traffic manager 114. The traffic manager 114 may prepare the data for transmission by creating the packets 128 that include the data and setting the priority 130 associated with the packets 128 to a high priority. For example, the priority 130 may be a higher priority than at least some of the other network traffic being sent from the computing device 102. The traffic manager 114 may send the packets 128 from the computing device 102 to the server 104 (or the computing devices 152). At the server 104, the remote analyzer 136 may extract the data from the packets 128 and determine whether the data matches one of the existing remote profiles 138. If the data matches one of the existing remote profiles 138, the remote analyzer 136 may select one of the remote profiles 138 that matches the data and send the selected profile 148 (e.g., in the results 146) to the computing device 102. If the data matches one of the existing remote profiles 138, the remote analyzer 136 may create (e.g., using the machine learning algorithm 142) the new profile 144 and send the new profile 144 (e.g., in the results 146) to the computing device 102. At the devices 152, the device analyzer 156 may extract the data from the packets 128 and determine whether the data matches one of the existing profiles 158. If the data matches one of the existing profiles 158, the device analyzer 156 may select one of the profiles 158 that matches the data and send the selected profile in the results 146 to the computing device 102. If the data does not match one of the existing profiles 158, the device analyzer 156 may create (e.g., using the distributed machine learning algorithm 162) a new profile and send the new profile (e.g., in the results 146) to the computing device 102. The traffic manager 164 may increase a priority of the results 146 (e.g., as compared to other network traffic being communicated by the computing devices 152) to enable the computing device 102 to receive the results 146 relatively quickly.

At 312, results may be received from the remote server. For example, in FIG. 1, the computing device 102 may receive the results 146 and store the profile 148 in the memory 110 (e.g., along with the local profiles 118). The profile 148 may be stored with an indication as to the application(s) for which the profile 148 is designed and, in some cases, the types of usages of the application for which the profile 148 is designed. For example, each particular usage of an application may have a different usage profile.

At 314, parameters associated with the computing device and/or the application may be configured based on the profile and the process 300 may repeat by proceeding to 302, where additional data is gathered. For example, in FIG. 1, the operating system 112 may, based on the results 146, modify the configuration 126 (e.g., a software and hardware configuration of the computing device 102) and/or modify the parameters 122(N) associated with the application 116(N). The operating system 112 may modify the configuration 126 and/or the parameters 122(N) to improve the execution of the application 116(N). For example, the modifications may result in more efficient utilization of computing resources, resulting in lower latency and increased throughput when the application 116(N) is executing.

Thus, the local analyzer 120 may determine that an application, such as the application 116(N), is executing, and gather the data 124(N) associated with the resource usage of the application 116(N). The local analyzer 120 may compare the resource usage data 124(N) with previously gathered resource usage data. If the current resource usage data 124(N) differs from the previously gathered resource usage data by more than a threshold amount, the local analyzer 120 may send the data 124(N) to the traffic manager 114 for forwarding (e.g., to the server 104 and/or the devices 152). The traffic manager 114 may create the packets 128 that include the data 124(N) and may modify the packets 128 to have a higher priority that at least some of the packets being sent from the computing device 102. The remote analyzer 136 may extract the data 124(N) from the packets 128 and either (i) identify one of the remote profiles 138 as matching the data 124(N) or (ii) create the new profile 144. The remote analyzer 136 may send the profile 148 (e.g., either the remote profiles 138 or the new profile 144) in the results 146. In some cases, the device analyzer 156 may extract the data 124(N) from the packets 128 and either (i) identify one of the profiles 158 as matching the data 124(N) or (ii) create a new profile and send the profile 148 (e.g., either one of the profiles 158 or a new profile) in the results 146. The traffic manager 164 may prioritize the results 146 (e.g., over other network traffic) to enable the computing device 102 to receive the results 146 relatively quickly. The computing device 102 may receive and apply the profile 148 by modifying the configuration 126, modifying the parameters 122(N), or modifying both. After modifying the configuration 126 and/or the parameters 122(N), the application 116(N) may execute more efficiently as compared to the execution of the application 116(N) before the profile 148 was applied. By using the traffic manager 114 to prioritize packets that include one or more of the data 124(1) to 124(N), the time interval between when the local analyzer 120 sends the data 124(N) to the traffic manager 114 and when the results 146 are received may be reduced to several seconds or less. In this way, custom configuration profiles can be provided to the computing device 102 (e.g., a workstation) when the computing device 102 is executing applications that are not addressed by the local profiles 118 or when applications are being used in ways that are not addressed by the local profiles 118.

Figure 4:
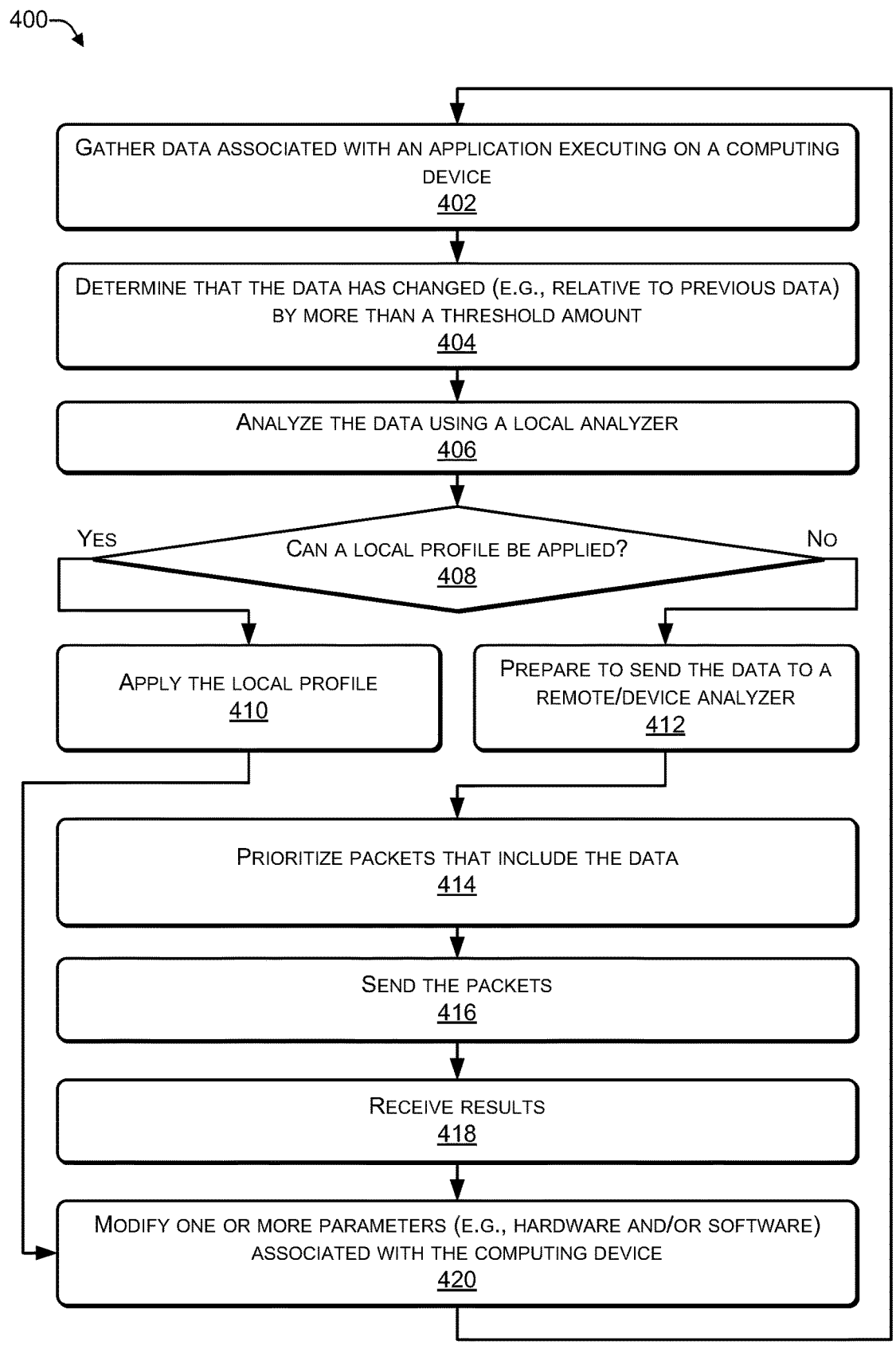
FIG. 4 is a flowchart of a process that includes prioritizing messages that include data according to some embodiments.

FIG. 4 is a flowchart of a process 400 that includes prioritizing messages that include data to be sent according to some embodiments. The process 400 may be performed by the computing device 102 of FIG. 1.

At 402, data associated with an application executing on a computing device may be gathered. At 404, a determination may be made that the data has changed by more than a threshold amount (e.g., compared to previous data). For example, in FIG. 1, the local analyzer 120 may gather resource usage data (e.g., the data 124(N)) associated with one or more of the applications 116 (e.g., the application 116(N)) that are executing on the computing device 102. The resource usage data may be gathered over a pre-determined (or user-specified) period of time, such as R minutes (where R>0). The local analyzer 120 may determine that a difference between (i) the gathered resource usage data and (ii) previously gathered resource usage data satisfies a threshold (e.g., is greater than a threshold amount). For example, the current resource usage by an application may differ by more than a threshold amount compared to previous resource usage by the same application, indicating that a new profile may be applied to improve the performance of the applications 116 that are executing. For example, the change in the data may indicate that the configuration 126, the parameters 122, or both may be modified to improve the performance of one or more of the applications 116.

At 406, the data may be analyzed using a local analyzer (e.g., local because it is executing on the computing device). At 408, a determination may be made whether a local profile can be applied. If a determination is made, at 406, that "yes" the local profile can be applied, then the local profile may be applied, at 410, and the process 400 may proceed to 420. If a determination is made, at 406, that "no" a local profile cannot be applied, then the data may be prepared (e.g., by creating packets that include the data) for transmission to an analyzer, at 412. For example, in FIG. 1, the local analyzer 120 may gather the data 124(N) associated with the application 116(N) and determine whether one of the local profiles 118 matches the application 116(N) and the usage characteristics indicated by the data 124(N). If one of the local profiles 118 matches, then the local analyzer 120 may apply the matching one of the local profiles 118, e.g., by modifying the parameters 124(N) associated with the application 116(N), by modifying the configuration 126 of the hardware and software of the computing device 102, or both. In some cases, if none of the local profiles 118 matches, then the local analyzer 120 may determine if the local analyzer 120 can create (e.g., using machine learning) a new local profile. If yes, then the local analyzer 120 may create a new local profile based on the resource usage data associated with application. If no, then the local analyzer 120 may send the gathered resource usage data (e.g., the data 124(N) corresponding to the application 116(N) executing on the computing device 102) to the traffic manager 114. The traffic manager 114 may prepare the data 124(N) for transmission to the remote analyzer 136 (or the device analyzer 156) by creating the packets 128 that include the data 124(N). The local analyzer 120 may determine whether to create a new local profile based at least in part on the amount of computational resources available on the computing device 102 and the expected impact of creating the new local profile on the computational resources of the computing device 102.

At 414, the packets that include the data may be prioritized. At 416, the packets (e.g., with the high traffic priority) may be sent before sending other, lower priority packets. For example, in FIG. 1, the traffic manager 114 may prepare the data for transmission by placing the data into the packets 128 and setting the priority 130 associated with the packets 128 carrying the data. The priority 130 may be a higher priority than at least some (and in some cases, more than 50%) of the other network traffic being sent from the computing device 102. The traffic manager 114 may send the packets 128 from the computing device 102 to the server 104 and/or the computing devices 152. At the server 104, the remote analyzer 136 may extract the data from the packets 128 and determine whether the data matches one of the existing remote profiles 138. If the data matches one of the existing remote profiles 138, the remote analyzer 136 may select one of the remote profiles 138 that matches the data and send the selected profile 148 (e.g., in the results 146) to the computing device 102. If the data does not match any of the existing remote profiles 138, the remote analyzer 136 may create (e.g., using the machine learning algorithm 142) the new profile 144 and send the new profile 144 (e.g., in the results 146) to the computing device 102. At the devices 152, the analyzer 156 may extract the data from the packets 128 and determine whether the data matches one of the profiles 158. If the data matches one of the profiles 158, the analyzer 156 may select one of the profiles 158 that matches the data and send the selected profile in the results 146 to the computing device 102. If the data does not match any of the profiles 158, the analyzer 156 may create (e.g., using the distributed machine learning algorithm 162) a new profile and send the new profile in the results 146 to the computing device 102. Before sending the results 146, the device analyzer 156 may instruct the traffic manager 164 to increase a priority of packets carrying the results 146 (e.g., as compared to at least some of the other packets that are being sent).

At 418, results may be received. For example, in FIG. 1, the computing device 102 may receive the results 146 and store the profile 148 in the memory 110 (e.g., along with the local profiles 118). The profile 148 may be stored with an indication as to the application(s) for which the profile 148 is designed and, in some cases, the types of usages of the application for which the profile 148 is designed. For example, each particular usage of an application may have a different usage profile.

At 420, parameters associated with the computing device and/or the application may be configured based on the profile, and the process 400 may repeat by proceeding to 402 where a new set of data may be gathered. For example, in FIG. 1, the operating system 112 may, based on the results 146, modify the configuration 126 (e.g., a software and hardware configuration of the computing device 102) and/or modify the parameters 122(N) associated with the application 116(N). The operating system 112 may modify the configuration 126 and/or the parameters 122(N) to improve the execution of the application 116(N). For example, the modifications may result in more efficient utilization of computing resources, resulting in lower latency and increased throughput when the application 116(N) is executing.

Thus, the local analyzer 120 may determine that an application, such as the application 116(N), is executing, and gather the data 124(N) associated with the resource usage of the application 116(N). The local analyzer 120 may compare the resource usage data 124(N) with previously gathered resource usage data. If the current resource usage data 124(N) differs from the previously gathered resource usage data by more than a threshold amount, the local analyzer 120 may determine to apply a different profile from a current profile that is being used. The local analyzer 120 may determine if one of the local profiles 118 matches (e.g., may be applicable to) the application 116(N) and the application's usage indicated by the data 124(N). If one of the local profiles 118 matches, then the local analyzer 120 may instruct the operating system 112 to modify the configuration 126 and/or the parameters 122(N) based on the matching one of the local profiles 118. If none of the local profiles 118 match, then the local analyzer 120 may send the data 124(N) to the traffic manager 114 for forwarding to the server 104. The traffic manager 114 may place create the packets 128 that include the data 124(N) and modify the packets 128 to have a higher priority that at least some of the packets being sent from the computing device 102. One or more of the analyzers 136, 156 may extract the data 124(N) from the packets 128 and either (i) identify one of the profiles 138, 158 as matching the data 124(N) or (ii) create the new profile 144. The analyzers 136, 156 may send the profile 148 (e.g., either the remote profiles 138, the new profile 144, or one of the profiles 158) in the results 146. In some cases, packets carrying the results 146 may be prioritized over network traffic that is being sent. The computing device 102 may receive and apply the profile 148 by modifying the configuration 126, modifying the parameters 122(N), or modifying both. After modifying the configuration 126 and/or the parameters 122(N), the application 116(N) may execute more efficiently as compared to the execution of the application 116(N) before the profile 148 was applied. By using the traffic manager 114 to prioritize packets that include one or more of the data 124(1) to 124(N), the time interval between when the local analyzer 120 sends the data 124(N) to the traffic manager 114 and when the results 146 are received may be reduced to several seconds or less. In this way, custom configuration profiles can be provided to the computing device 102 (e.g., a workstation) when the computing device 102 is executing applications that are not addressed by the local profiles 118 or when applications are being used in ways that are not addressed by the local profiles 118.

Figure 5:
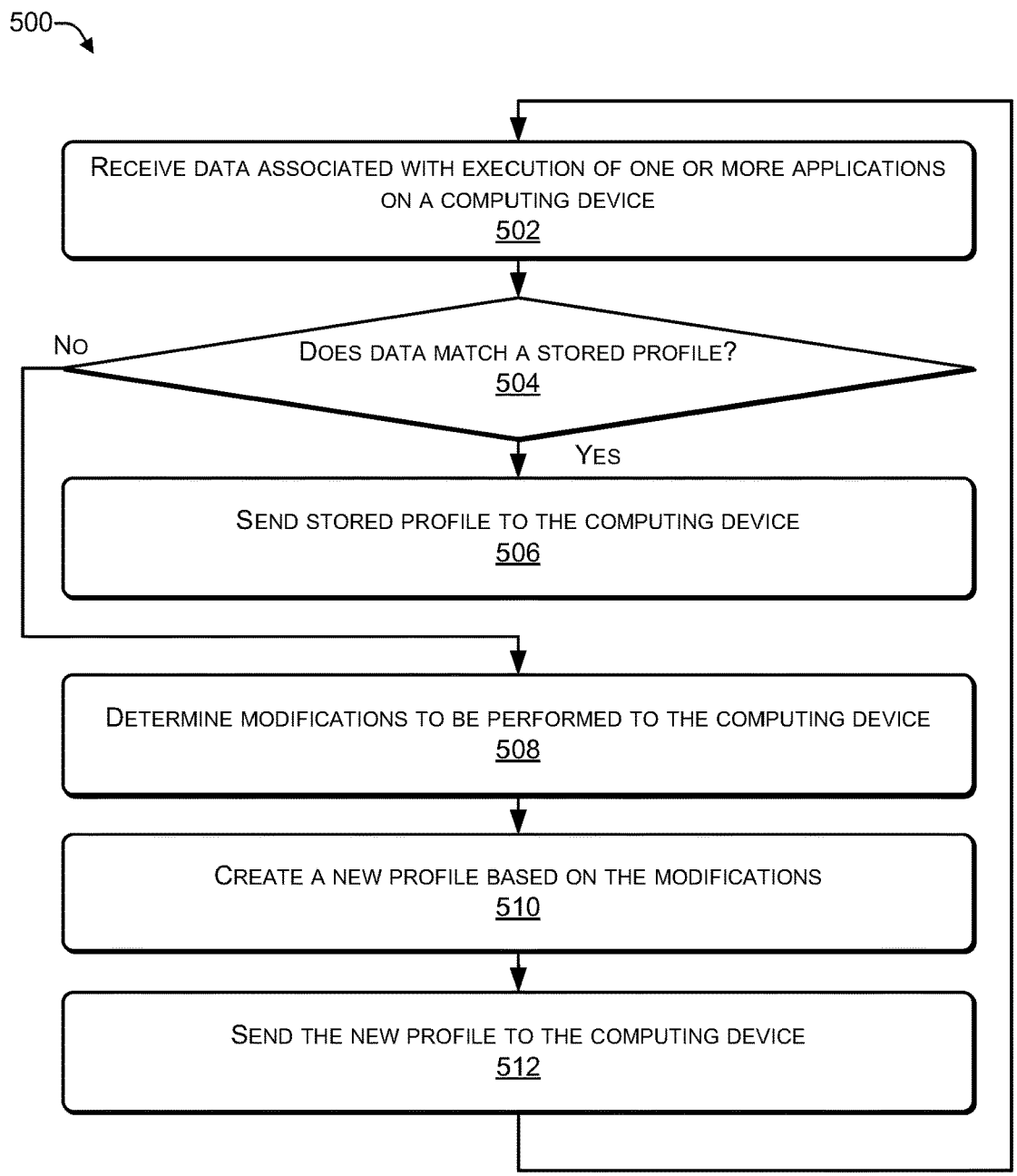
FIG. 5 is a flowchart of a process that includes determining modifications to perform to a computing device according to some embodiments.

FIG. 5 is a flowchart of a process 500 that includes determining modifications to perform to a computing device according to some embodiments. The process 500 may be performed by the server 104 or one or more of the computing devices 152 of FIG. 1.

At 502, data associated with one or more applications executing on a computing device may be received. At 504, a determination may be made whether the data matches a stored profile. In response to determining, at 504, that "yes" the data matches a stored profile, then the stored profile may be sent to the computing device, at 506. In response to determining, at 504, that "no" the data does not match a stored profile, then the process proceeds to 508. For example, in FIG. 1, the remote analyzer 136 may receive the packets 128 from the computing device 102 and extract the resource usage data 124 associated with execution of one (or more) of the applications 116. The remote analyzer 136 may determine whether the data matches one of the remote profiles 138 or associated stored data 140. If the data matches, then one of the corresponding remote profile 138 may be sent to the computing device 102. For example, if the data from the packets 128 matches the remote profile 138(P) or the stored data 140(P), then the remote profile 138(P) may be selected and sent in the results 146 to the computing device 102.

The analyzer 156 may receive the packets 128 from the computing device 102 and extract the resource usage data 124 associated with execution of one (or more) of the applications 116. The analyzer 156 may determine whether the data matches one of the profiles 158 or associated stored data 160. If the data matches, then one of the corresponding profiles 158 may be sent to the computing device 102. For example, if the data from the packets 128 matches a first of the profiles 158 or a first of the stored data 160, then the first of the profiles 158 may be selected and sent in the results 146 to the computing device 102. The traffic manager 164 may modify the results 146 to have a higher priority than other network traffic being sent.

At 508, modifications to be performed to the computing device may be determined. At 510, a new profile may be created based on the modifications. At 512, the new profile may be sent to the computing device. The process 500 may then proceed to 502 and wait to receive additional data. For example, in FIG. 1, if the data from the packets 128 does not match any of the remote profiles 138 or the stored data 140, then the remote analyzer 136 may use the machine learning algorithm 142 to create the new profile 144. The new profile 144 may identify modifications to the configuration 126 and/or modifications to one or more of the parameters 122 to improve (e.g., reduce latency, increase throughput, and the like) an execution of one or more of the applications 116. The remote analyzer 136 (or the analyzer 156) may send the new profile 144 in the results 146 to the computing device 102.

Thus, the remote analyzer 136 (or the analyzer 156) may extract the data 124(N) from the packets 128 and either (i) identify one of the remote profiles 138 (or the profiles 158) and associated stored data 140 (or data 160) as matching the data 124(N) or (ii) create the new profile 144. The remote analyzer 136 (or the analyzer 156) may send the profile 148 (e.g., either the remote profiles 138, the profiles 158, or the new profile 144) in the results 146.

Figure 6:
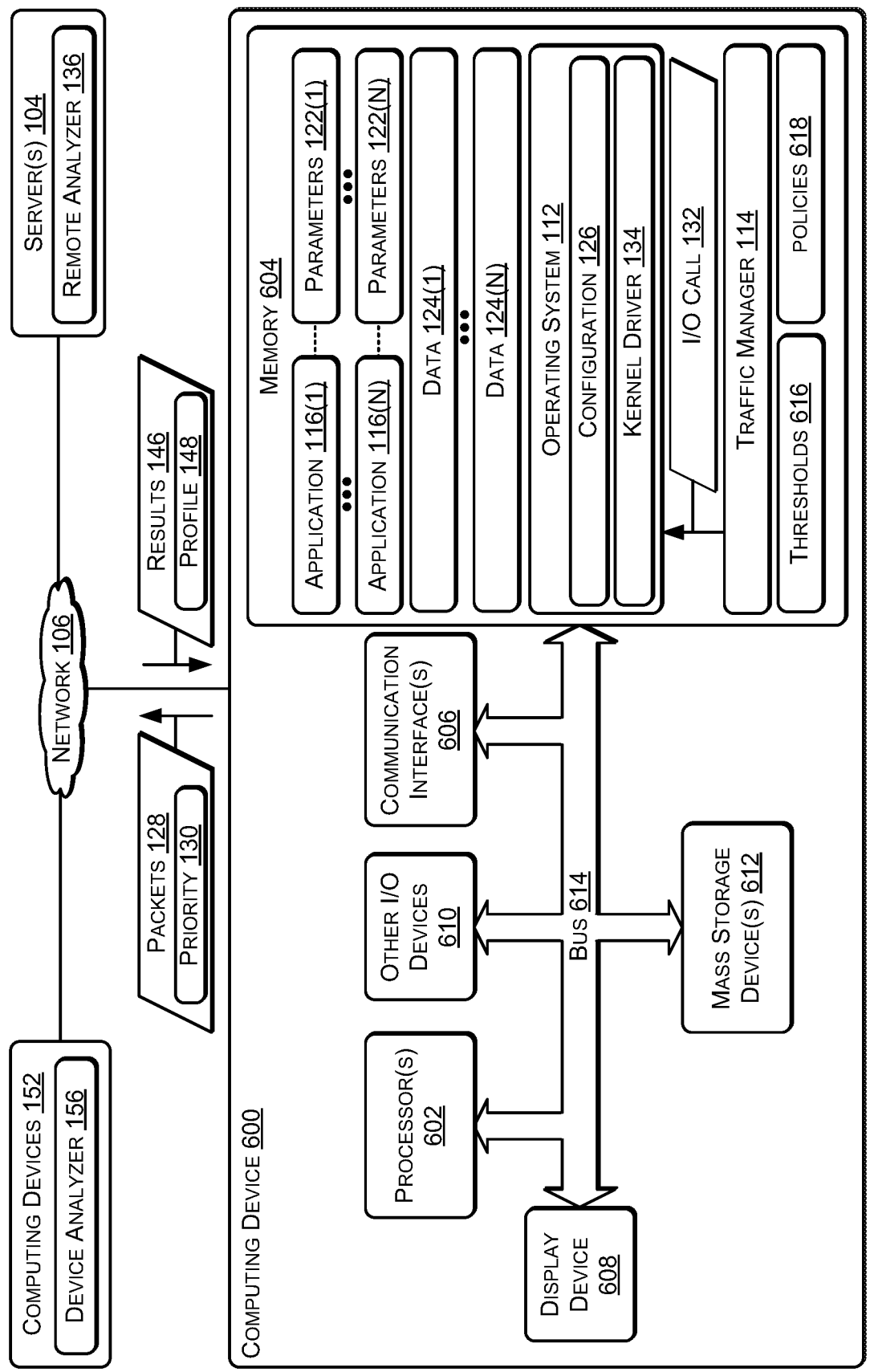
FIG. 6 illustrates an example configuration of a computing device that can be used to implement the systems and techniques described herein.

FIG. 6 illustrates an example configuration of a computing device 600 that can be used to implement the systems and techniques described herein, such as, for example, one or more of the computing device 102, the computing devices 152, and the server 104. The computing device 600 may include one or more processors 602 (e.g., the CPU 108 and the GPU 109 of FIG. 1), the memory 604 (e.g., the memory 110 of FIG. 1), communication interfaces 606, a display device 608, other input/output (I/O) devices 610 (e.g., keyboard, trackball, and the like), and one or more mass storage devices 612, configured to communicate with each other, such as via one or more system buses 614 or other suitable connections. While a single system bus is illustrated for ease of understanding, it should be understood that the system buses 614 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are hardware devices (e.g., integrated circuits) that may include a single processing unit or a number of processing units, all of which may include single or multiple computing units or multiple cores. The multiple cores and other computing resources described herein may be configurable using the configuration 126. For example, various policies 618 may be used to specify the resources to which each of the applications 116 has access. For example, some of the applications 116 may be granted access to a certain number of cores, a certain amount of the memory 604 (e.g., RAM), a certain amount of the storage 612 (e.g., space on a disk drive), and the like. The processors 602 may include the GPU 109 integrated into the CPU 108 or the GPU 109 may be a separate processor device from the CPU 108. The processors 602 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 602 may be configured to fetch and execute computer-readable instructions stored in the memory 604, mass storage devices 612, or other computer-readable media.

Memory 604 and mass storage devices 612 are examples of computer storage media (e.g., memory storage devices) for storing instructions that can be executed by the processors 602 to perform the various functions described herein. For example, memory 116 may include both volatile memory and non-volatile memory (e.g., RAM, ROM, or the like) devices. Further, mass storage devices 612 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be any type of non-transitory storage media capable of storing computer-readable, processor-executable program instructions as computer program code that can be executed by the processors 602 as a particular machine configured for carrying out the operations and functions described in the implementations herein.

The computing device 100 may also include one or more communication interfaces 606 for exchanging data via a network. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

Other I/O devices 610 may be devices that receive various inputs from a user and provide various outputs to the user, and may include a keyboard, a touchpad, a mouse, a printer, audio input/output devices, and so forth.

The computer storage media, such as memory 604 and mass storage devices 612, may be used to store software and data. For example, the computer storage media may be used to store the applications 116, the parameters 122, the data 124, the operating system 112 (including the configuration 126 and the kernel driver 134), the traffic manager 114, various thresholds, and other types of data.

The local analyzer 120 may determine that an application, such as the application 116(N), is executing, and gather the data 124(N) associated with the resource usage of the application 116(N). If the local analyzer 120 determines that the local profiles 118 do not match the application 116(N) and the associated data 124(N), then the local analyzer 120 may send the data 124(N) (including information identifying the application 116(N)) to the traffic manager 114 for forwarding to the server 104. The traffic manager 114 may place the data 124(N) in the packets 128 and modify the packets 128 to have a high priority 130 (e.g., a higher priority than at least some of the network traffic being sent from the computing device 102). For example, the traffic manager 114 may use the I/O call 132 (e.g., IOCTL) to the kernel driver 134 to modify the packets 128 to have the high priority 130 and send the packets 128 to the server 104 for analysis.

The remote analyzer 136 may extract the data 124(N) from the packets 128 and either (i) identify a remote profile as matching the data 124(N) or (ii) create a new profile. For example, the new profile may be created using a machine learning algorithm. The remote analyzer 136 may send the profile 148 (e.g., either a remote profile or a new profile) in the results 146. The computing device 102 may receive and apply the profile 148 by modifying the configuration 126, modifying the parameters 122(N), or modifying both. After applying the profile 148 (e.g., by modifying the configuration 126 and/or the parameters 122(N)), the application 116(N) may execute more efficiently (e.g., with reduced latency, increased throughput, and the like) as compared to the execution of the application 116(N) before the profile 148 was applied. By using the traffic manager 114 to prioritize packets that include one or more of the data 124(1) to 124(N), the time interval between when the local analyzer 120 sends the data 124(N) to the traffic manager 114 and when the results 146 are received may be reduced to several seconds or less. If the traffic manager 114 were not used, the packets 128 might incur a delay in being sent, resulting in a length wait time between when the local analyzer 120 sends the data 124(N) to the traffic manager 114 and when the results 146 are received. In this way, custom configuration profiles can be provided to the computing device 102 (e.g., a workstation) when the computing device 102 is executing applications that are not addressed by the local profiles 118 or when applications are being used in ways that are not addressed by the local profiles 118.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    gathering, by one or more processors of a local computing device, local usage data indicating a usage of multiple computing resources by an application being locally executed by the local computing device, and not as part of a distributed computer system, the data comprising:
        a clock speed of a central processing unit (CPU) of the local computing device;
        a number of threads associated with the locally executing application that are being executed by the CPU;
        a graphics memory utilization of a graphics processing unit (GPU) of the local computing device; and
        a temperature of the GPU;
    determining if a profile exists on the local computing device that is associated with the locally executing application; and
    then only one of:
        selecting an existing profile for use by the local computing device only if the existing profile on the local computing device is determined to be associated with the locally executing application, or
        performing the following if no existing profile on the local computing device is determined to be associated with the locally executing application:
            generating, by the one or more processors of the local computing device, one or more packets, wherein each packet of the one or more packets includes at least a portion of the local usage data,
            setting, by the one or more processors of the local computing device, a priority of each packet of the one or more packets to prioritize the packets including the local usage data over other packets that do not include the local usage data,
            sending, by the one or more processors of the local computing device, the one or more packets to a remote server or one or more additional remote computing devices,
            receiving, by the one or more processors of the local computing device from the remote server or the one or more additional remote computing devices, a new profile to modify a configuration of the local computing device to increase throughput of the locally executing application being executed by the local computing device,
            modifying, by the one or more processors of the local computing device, an original configuration of the local computing device based at least in part on the new profile to create a modified configuration of the local computing device,
            executing, by the one or more processors of the local computing device, the locally executing application based on the modified configuration, and
            determining, by the one or more processors of the local computing device, that the throughput of the locally executing application has increased using the modified configuration as compared to using the original configuration of the local computing device.

2. The method of claim 1, wherein the local usage data further comprises:
    a disk drive utilization by the locally executing application comprising a location and a size of at least one file created by the locally executing application; and
    a random-access memory (RAM) utilization by the locally executing application.

3. The method of claim 1, wherein the local usage data further comprises:
    a queue length of the CPU,
    a number of cores of the CPU being used by the locally executing application;
    a first size of temporary files created by the locally executing application;
    a second size of permanent files created by the locally executing application; and
    a network bandwidth utilization of the locally executing application comprising:
        a first amount of received data by the locally executing application; and
        a second amount of sent data by the locally executing application.

4. The method of claim 1, wherein setting the priority of each packet of the one or more packets comprises increasing the priority of each packet of the one or more packets to a higher priority than other packets using an input/output (I/O) control call to a kernel driver that is used to manage outgoing packets.

5. The method of claim 1, wherein the modified configuration specifies at least one of:
    a maximum number of central processing unit (CPU) cores that the locally executing application can use;
    a process priority control policy indicating a process priority for processes associated with the locally executing application;

a system power utilization policy indicating how electrical power is to be utilized;

a CPU hyperthreading policy indicating when the locally executing application can use hyperthreading; and a vertical sync (VSync) parameter associated with a graphics processing unit (GPU) of the local computing device.

6. The method of claim 1, wherein, before generating the one or more packets, the method further comprises:

comparing the local usage data with previously gathered local usage data associated with a previous execution of the locally executing application;

determining whether a difference between the local usage data and the previously gathered local usage data satisfies a predetermined threshold; and then generating the one or more packets only if the difference between the data and the previously gathered data satisfies the predetermined threshold.

7. The method of claim 1, wherein the remote server is configured to perform operations comprising:

receiving the packets sent from the local computing device;

extracting the local usage data from the packets;

determine if the extracted local usage data matches any stored profile;

then only one of:

selecting a stored profile as the new profile only if the extracted local usage data is determined to match the stored profile, or creating, using a machine learning algorithm, the new profile based on the local usage data only if the extracted local usage data is determined not to match any stored profile; and then sending the new profile to the local computing device.

8. The method of claim 1, where no profiles exist on the local computing device that are associated with the locally executing application; and where the new profile comprises a custom profile created based at least in part on the local usage data to create the modified configuration of the local computing device for executing the local executing application.

9. The method of claim 1, further comprising performing the following if no existing profile on the local computing device is determined to be associated with the locally executing application:

sending, by the one or more processors of the local computing device, the one or more packets across a network to the remote server;

executing a cloud-based service on the remote server to create the new profile; and receiving the new profile, by the one or more processors of the local computing device across the network from the remote server.

10. The method of claim 1, further comprising performing the following if no existing profile on the local computing device is determined to be associated with the locally executing application:

sending, by the one or more processors of the local computing device, the one or more packets across a network to at least one of the additional remote computing devices that is located at an outer edge of the network;

creating the new profile on the at least one additional remote computing device; and receiving the new profile, by the one or more processors of the local computing device across the network from the at least one additional remote computing device.

11. The method of claim 10, where the local computing device is located at an outer edge of the network.

12. A local computing device comprising:

one or more processors; and one or more non-transitory computer-readable storage media to store a configuration of the computing device and to store instructions executable by the one or more processors to perform operations comprising:

executing an application executing locally on the local computing device, and not as part of a distributed computer system;

gathering local usage data associated with a usage, by the locally executing application, of multiple computing resources of the local computing device, the local usage data comprising:

a clock speed of a central processing unit (CPU) of the local computing device;

a number of threads associated with the locally executing application that are being executed by the CPU;

a graphics memory utilization of a graphics processing unit (GPU) of the local computing device; and a temperature of the GPU;

determining if a profile exists on the local computing device that is associated with the locally executing application; and then only one of:

selecting an existing profile for use by the local computing device only if the existing profile on the local computing device is determined to be associated with the locally executing application, or performing the following if no existing profile on the local computing device is determined to be associated with the locally executing application:

generating one or more packets, wherein each packet of the one or more packets includes at least a portion of the local usage data, setting a priority of each packet of the one or more packets, sending the one or more packets to a remote server or one or more additional remote computing devices, receiving a new profile to modify a configuration of the local computing device to increase throughput of the locally executing application being executed by the local computing device, modifying an original configuration of the local computing device based at least in part on the new profile to create a second configuration, executing the locally executing application based on the second configuration, and determining that throughput of the locally executing application has increased using the second configuration as compared to using the original configuration.

13. The computing device of claim 12, where the operations further comprise:

executing a second application;

gathering second local usage data identifying a second usage, by the second application, of the multiple computing resources of the local computing device;

selecting, based on the second local usage data associated with the second application, a local profile;

modifying the second configuration based at least in part on the local profile to create a third configuration; and determining that executing the second application using the third configuration causes the second application to have at least one of a reduced latency or an increased throughput.

14. The computing device of claim 12, wherein the local usage data further comprises:
   a disk drive utilization by the locally executing application comprising a location and a size of at least one file created by the locally executing application; and
   a random-access memory (RAM) utilization by the locally executing application.

15. The computing device of claim 12, wherein the local usage data further comprises:
   the clock speed of the CPU during execution of the locally executing application,
   a queue length of the CPU during execution of the locally executing application and
   a number of cores of the CPU used by the locally executing application during execution of the locally executing application.

16. The computing device of claim 12, wherein setting the priority of each packet of the one or more packets comprises increasing the priority of each packet of the one or more packets to a higher priority than other packets using an input/output (I/O) control call to a kernel driver that is used to manage outgoing packets.

17. The computing device of claim 12, wherein the second configuration specifies at least one of:
   a maximum number of central processing unit (CPU) cores that the locally executing application can use;
   a process priority control policy indicating a higher process priority for processes associated with the locally executing application;
   a system power utilization policy indicating utilization of electrical power;
   a CPU hyperthreading policy indicating when the locally executing application can use hyperthreading; and
   a vertical sync (VSync) parameter associated with a graphics processing unit (GPU) of the local computing device.

18. The computing device of claim 12, wherein at least one computing device of the one or more additional remote computing devices:
   receives the packets sent from the local computing device;
   extracts the data from the packets;
   identifies an existing profile based on the data;
   creates a second set of packets that include the existing profile;
   modifies a priority of the second set of packets to a high priority; and
   sends the second set of packets that include the existing profile to the local computing device.

19. One or more non-transitory computer-readable storage media to store instructions executable by one or more processors of a local computing device to perform operations comprising:
   executing an application executing locally on the local computing device, and not as part of a distributed computer system;
   gathering local usage data associated with a usage, by the locally executing application, of multiple computing resources of the local computing device, the local usage data comprising:
      a clock speed of a central processing unit (CPU) of the local computing device;
      a number of threads associated with the locally executing application that are being executed by the CPU;
      a graphics memory utilization of a graphics processing unit (GPU) of the local computing device; and
      a temperature of the GPU;
   determining if a profile exists on the local computing device that is associated with the locally executing application; and
   then only one of:
      selecting an existing profile for use by the local computing device only if the existing profile on the local computing device is determined to be associated with the locally executing application, or
      performing the following if no existing profile on the local computing device is determined to be associated with the locally executing application:
         generating one or more packets, wherein each packet of the one or more packets includes at least a portion of the local usage data,
         setting a priority of each packet of the one or more packets,
         modifying a priority of each packet of the one or more packets to a high priority,
         sending the one or more packets having the high priority to a remote server or one or more additional remote computing devices,
         receiving a new profile to modify a configuration of the local computing device to increase throughput of the locally executing application being executed by the local computing device,
         modifying an original configuration of the local computing device, based at least in part on the new profile, to create a second configuration,
         executing the locally executing application based on the second configuration, and
         determining that throughput of the locally executing application has increased using the second configuration as compared to using the original configuration.

20. The one or more non-transitory computer-readable storage media of claim 19, further comprising:
   executing a second application;
   gathering second local usage data identifying a second usage, by the second application, of the multiple computing resources of the local computing device;
   selecting, based on the second local usage data associated with the second application, a local profile;
   modifying the second configuration based at least in part on the local profile to create a third configuration; and
   determining that executing the second application using the third configuration causes the second application to have at least one of a reduced latency or an increased throughput.

21. The one or more non-transitory computer-readable storage media of claim 19, wherein the local usage data further comprises:
   a disk drive utilization by the locally executing application comprising a location and a size of at least one file created by the locally executing application; and
   a random-access memory (RAM) utilization by the locally executing application.

22. The one or more non-transitory computer-readable storage media of claim 21, wherein the local usage data further comprises:
   the clock speed of the CPU during execution of the locally executing application, a queue length of the CPU during execution of the locally executing application, and a number of cores of the CPU used by the locally executing application during execution of the locally executing application.

23. The one or more non-transitory computer-readable storage media of claim 19, wherein the priority of each packet of the one or more packets is modified to the high priority using an input/output (I/O) control call to a kernel driver that is used to manage outgoing packets.

24. The one or more non-transitory computer-readable storage media of claim 19, wherein the second configuration specifies at least one of:
- a maximum number of central processing unit (CPU) cores that the locally executing application can use;
- a process priority control policy indicating a higher process priority for processes associated with the locally executing application;
- a system power utilization policy indicating utilization of electrical power;
- a CPU hyperthreading policy indicating when the locally executing application can use hyperthreading; and
- a vertical sync (VSync) parameter associated with a graphics processing unit (GPU) of the local computing device.

* * * * *